(12) United States Patent
Koyama

(10) Patent No.: US 10,829,219 B2
(45) Date of Patent: Nov. 10, 2020

(54) TRASH CAN DEVICE FOR AIRCRAFT LAVATORY UNIT

(71) Applicant: The Yokohama Rubber Co., LTD., Tokyo (JP)

(72) Inventor: Takashi Koyama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 16/633,555

(22) PCT Filed: Jul. 23, 2018

(86) PCT No.: PCT/JP2018/027448
§ 371 (c)(1),
(2) Date: Jan. 23, 2020

(87) PCT Pub. No.: WO2019/021987
PCT Pub. Date: Jan. 31, 2019

(65) Prior Publication Data
US 2020/0180767 A1    Jun. 11, 2020

(30) Foreign Application Priority Data
Jul. 24, 2017 (JP) .................................. 2017-142875

(51) Int. Cl.
*B64D 11/02* (2006.01)
*B65F 1/14* (2006.01)
*A62C 3/08* (2006.01)

(52) U.S. Cl.
CPC .................................. *B64D 11/02* (2013.01)

(58) Field of Classification Search
CPC ....... B64D 11/02; B64D 11/04; B65F 1/1426; A62C 3/08
See application file for complete search history.

(56) References Cited

U.S. PATENT DOCUMENTS

| | | | | |
|---|---|---|---|---|
| 3,866,861 A | * | 2/1975 | Ratcliff | B64D 11/00 244/118.5 |
| 4,573,650 A | * | 3/1986 | Clayton | B64D 11/02 244/1 R |

(Continued)

FOREIGN PATENT DOCUMENTS

| | | |
|---|---|---|
| JP | S63-197201 | 12/1988 |
| JP | H01-164201 | 11/1989 |

(Continued)

OTHER PUBLICATIONS

International Search Report for International Application No. PCT/JP2018/027448 dated Oct. 16, 2018, 3 pages, Japan.

*Primary Examiner* — Brian M O'Hara
(74) *Attorney, Agent, or Firm* — Thorpe North & Western

(57) ABSTRACT

A trash can device for an aircraft lavatory unit is provided, including: a waste container in a storage chamber of the aircraft lavatory unit; a chute, disposed above the waste container, including a trash feed opening formed at a section of the chute corresponding to a trash feed port of a panel sectioning off the storage chamber; and a waste flap that opens and closes the trash feed opening. A fire spreading prevention space is formed below the chute in a state when the waste flap is positioned in a closed position in which the trash feed opening is closed by the waste flap. The trash can device is provided with a holding/moving portion of the waste flap, the holding/moving portion holds the waste flap in an open position in which the trash feed opening is opened and moves the waste flap to the closed position when exposed to heat.

6 Claims, 14 Drawing Sheets

(56) References Cited

U.S. PATENT DOCUMENTS

| | | | |
|---|---|---|---|
| 4,643,324 A | 2/1987 | Palmer | |
| 9,415,873 B2 * | 8/2016 | McIntosh | ............... B64D 11/04 |
| 2018/0265202 A1 | 9/2018 | Koyama et al. | |

FOREIGN PATENT DOCUMENTS

| | | |
|---|---|---|
| JP | 3133875 | 7/2007 |
| WO | WO 2017/043177 | 3/2017 |
| WO | WO 2017/098572 | 6/2017 |

* cited by examiner

TRASH CAN DEVICE FOR AIRCRAFT LAVATORY UNIT

TECHNICAL FIELD

The present technology relates to a trash can device for an aircraft lavatory unit.

BACKGROUND ART

An aircraft lavatory unit includes a structural frame in which a lavatory is provided; in addition to a sink and a toilet bowl, a trash can device is disposed in the lavatory.

The trash can device includes a trash can device body including a chute where a trash feed opening is formed, a waste flap that opens and closes the trash feed opening, and a waste container that stores trash fed from the trash feed opening.

The trash can device body is housed in a storage chamber sectioned off by a panel inside the lavatory, and a fire extinguisher is attached to the chute.

A trash feed port corresponding to the trash feed opening is formed on an upper portion of a panel that rises from the floor of the lavatory, the panel being part of the panel sectioning off the storage chamber. In addition, the portion of the panel located below the trash feed port is formed as an opening/closing plate that opens and closes the storage chamber to allow removal of the waste container from the storage chamber.

Also, a trash can device of an aircraft lavatory unit is required to satisfy the Fire Containment requirements specified in United States Federal Aviation Regulations (FAR) 25.853.

That is, it is required that a fire spreading prevention space including a trash storage space be formed below the chute when the waste flap is in a closed position in which the trash feed opening is closed by the waste flap.

To meet this requirement, the present applicant proposed trash can device for an aircraft lavatory unit which is advantageous for reducing the weight of the lavatory unit by reducing number of parts, in that the chute, the waste flap, and the waste container are made of a plate material having fire resistance performance; the upper portion of the waste container and the lower portion of the chute are detachably joined, and in a state where the upper portion of the waste container and the lower portion of the chute are joined, a fire spreading prevention space is formed inside them (see International Patent Publication No. WO 2017/043177).

Meanwhile, when trash is fed into a trash storage space from the trash feed opening in a case where the waste flap is usually at the closed position, the finger of the user touches the waste flap, causing an unpleasant feeling in certain people.

In order to eliminate such unpleasant feelings, it may be possible to remove the waste flap or to leave the waste flap in an opened position in which the trash feed opening is opened; however, this does not satisfy the Fire Containment requirements specified in United States Federal Aviation Regulations (FAR) 25.853.

SUMMARY

The present technology has been devised in view of the above circumstances, and the present technology provides a trash can device for an aircraft lavatory unit that allows a user to feed trash from a trash feed opening to a trash storage space without touching a waste flap while satisfying the Fire Containment requirements specified in United States Federal Aviation Regulations (FAR) 25.853.

An embodiment according to the present technology is an aircraft lavatory unit provided with a trash can device including a waste container, housed in a storage chamber of the aircraft lavatory unit, including a trash storage space, a chute, disposed above the waste container, including a trash feed opening formed at a section of the chute corresponding to a trash feed port of a panel sectioning off the storage chamber, a waste flap that opens and closes the trash feed opening. A fire spreading prevention space is formed below the chute in a state when the waste flap is positioned in a closed position in which the trash feed opening is closed by the waste flap, and the trash can device is provided with a holding/moving portion of the waste flap, the holding/moving portion holds the waste flap in an open position in which the trash feed opening is opened and moves the waste flap to the closed position when exposed to heat.

According to an embodiment of the present technology, it is possible to provide a trash can device for an aircraft lavatory unit that allows a user to feed trash from a trash feed opening to a trash storage space without touching a waste flap while satisfying the Fire Containment requirements specified in United States Federal Aviation Regulations (FAR) 25.853.

DETAILED DESCRIPTION

First Embodiment

Embodiments of the present technology will be described with reference to the drawings.

First, a lavatory unit 10 according to a first embodiment will be described with reference to FIGS. 1 to 16.

Figure 1:
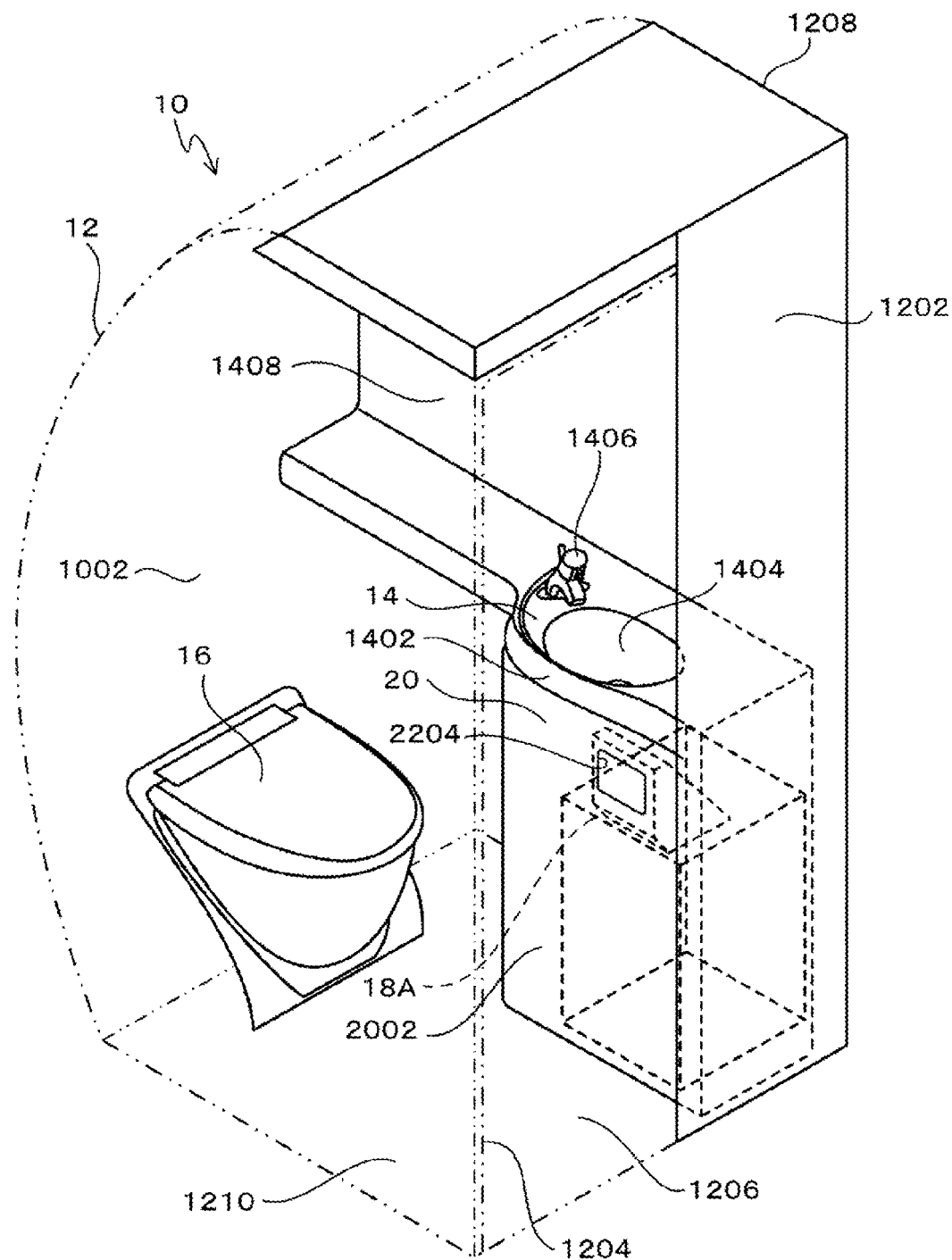
FIG. 1 is a perspective view of a lavatory unit according to a first embodiment.

As illustrated in FIG. 1, the lavatory unit 10 has a structural frame 12 which is installed on the floor of an aircraft, and a lavatory 1002 is formed inside the structural frame 12.

A front surface wall 1202 of the lavatory 1002 is provided with an entrance 1204, and the entrance 1204 is opened and closed by a door 1206.

A sink 14, a toilet bowl 16, and a trash can device 18A are disposed in the lavatory 1002.

The toilet bowl 16 is disposed in front of a rear surface wall. The sink 14 is provided on the inner side of a side wall 1208 and on the upper surface of a base 20 disposed on a bottom wall (floor) 1210 of the lavatory 1002. The sink 14 includes a counter 1402, a sink basin 1404, a faucet 1406, and a mirror 1408.

Figure 2:
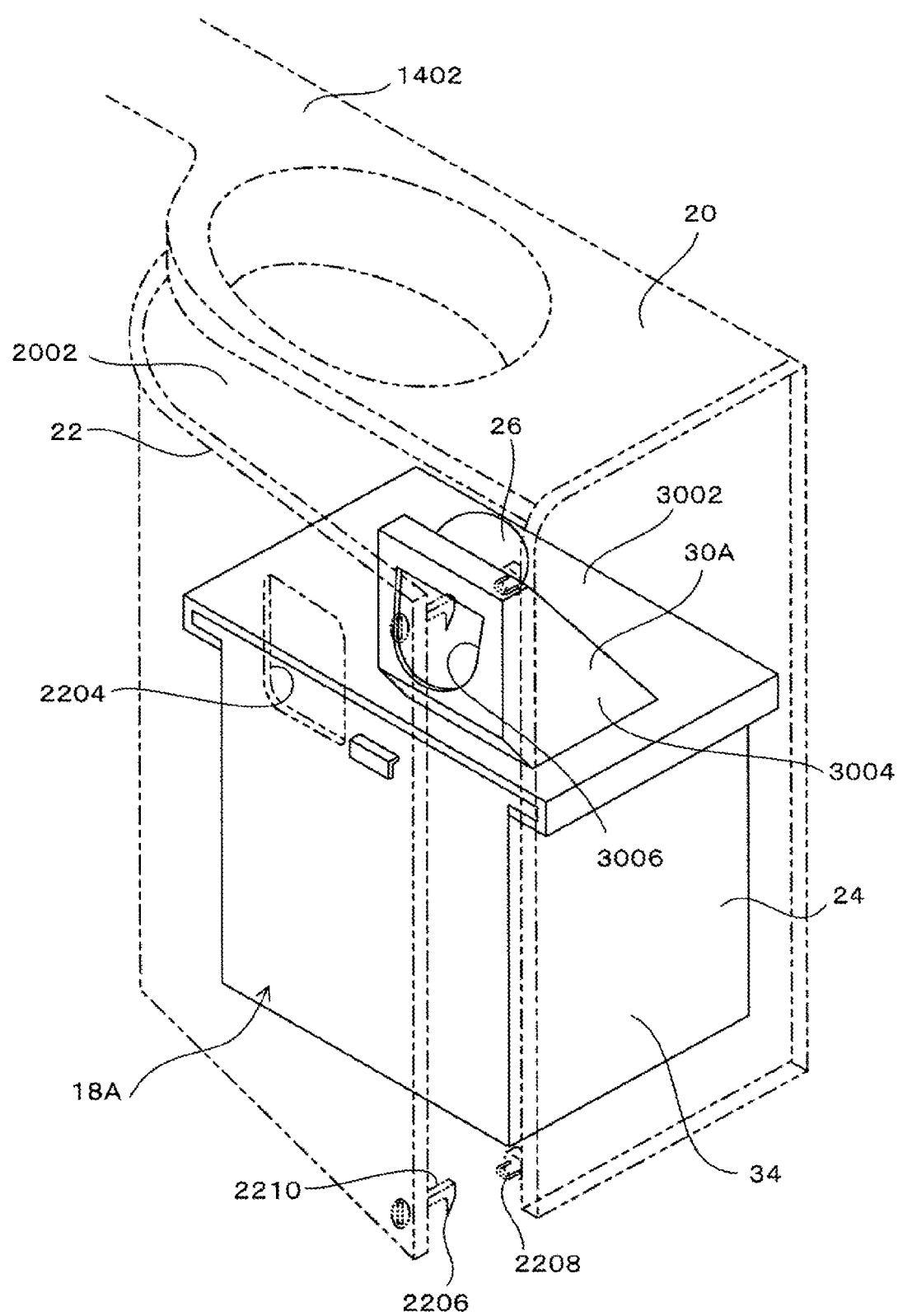
FIG. 2 is a perspective view of a trash can device according to the first embodiment.

As illustrated in FIG. 2, a storage chamber 2002 in which the trash can device 18A is housed is formed in the inner portion of the base 20.

Figure 7:
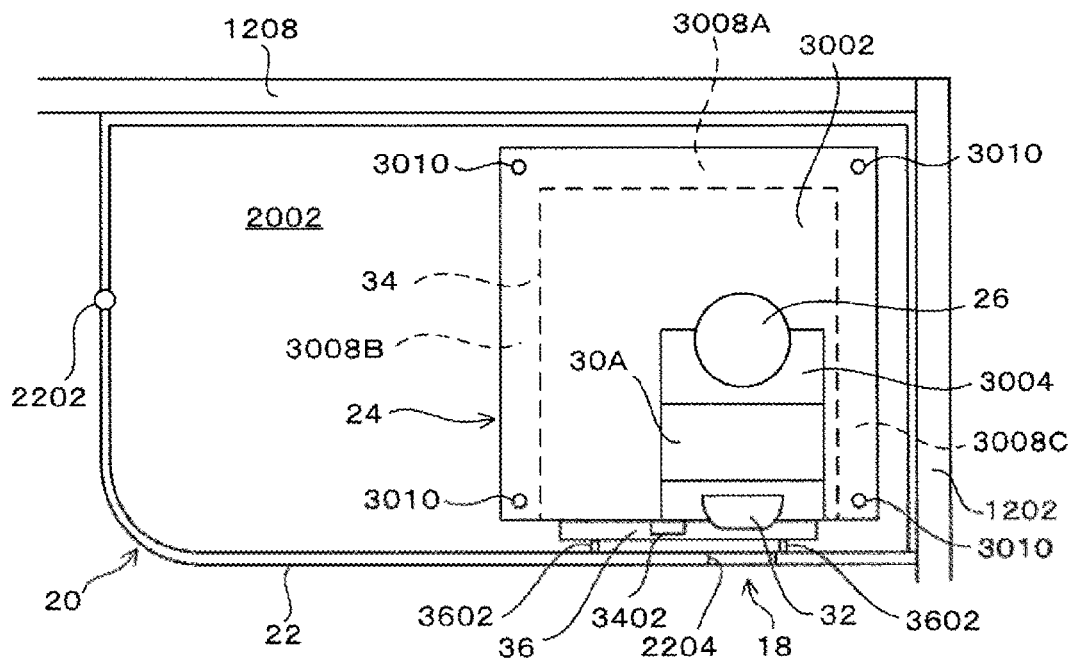
FIG. 7 is a plan view of the trash can device according to the first embodiment.

The portion of the panel sectioning off the storage chamber 2002 extending downward from the upper surface of the base 20 is provided as an opening/closing plate 22 that opens and closes the storage chamber 2002. As illustrated in FIG. 7, the opening/closing plate 22 swings about a hinge 2202 as a fulcrum.

A trash feed port 2204 is formed on the opening/closing plate 22. In the present embodiment, the panel which includes the trash feed port 2204 and sections off the storage chamber 2002 is the opening/closing plate 22. The opening/closing plate 22 is a vertical panel that rises from the floor of the aircraft lavatory unit 10, and the trash feed port 2204 is formed on a surface extending up and down the vertical panel.

In addition, as illustrated in FIG. 2, in order to prevent tampering and terrorism, the opening/closing plate 22 takes a structure that cannot be easily opened, such that the opening/closing plate 22 is provided with an engaging/disengaging mechanism 2210 in that, in a state when the storage chamber 2002 is closed, a latch 2206 on the opening/closing plate 22 engages a striker 2208 on the base 20.

As shown in FIGS. 3 to 7, the trash can device 18A includes a trash can device body 24 and a fire extinguisher 26. The trash can device body 24 includes a chute 30A, a waste flap 32, and a waste container 34. A fire spreading prevention space 38 (see FIG. 5) described below is formed inside the trash can device body 24.

The chute 30A, the waste flap 32, and the waste container 34 are formed of a material having fire resistance performance, and examples of such materials that can be used include metallic materials such as aluminum or stainless steel, flame retardant resins, and the like.

The chute 30A includes a rectangular bottom plate portion 3002 and a projection portion 3004 projecting upward from the bottom plate portion 3002, and a trash feed opening 3006 is formed at a section of the projection portion 3004 corresponding to the trash feed port 2204. More specifically, the trash feed opening 2204 is provided on a surface that extends in the vertical direction of the chute 30A.

Except for one side of the bottom plate portion 3002 that is disposed close to the opening/closing plate 22, a rear groove 3008A, a left groove 3008B, and a right groove 3008C are formed wrapping inward below the bottom plate portion 3002 on the remaining three sides of the bottom plate portion 3002.

The chute 30A is held within the storage chamber 2002. In the present embodiment, the chute 30A is held by a plurality of support members 3010 provided between the four corners of the bottom plate portion 3002 and the upper plate of the storage chamber 2002, meanwhile, various structures may be employed for holding the chute 30A, such as a flange connecting the bottom plate portion 3002 to the panel surface inside the storage chamber 2002 to hold the chute 30A.

The fire extinguisher 26 is provided on the projection portion 3004.

The fire extinguisher 26 sprays a fire-extinguishing agent from the spray nozzle 2602 into the trash can device body 24 when a set temperature is reached or exceeded. A known inert gas, such as chlorofluorocarbon gas or halon gas, can be used as the fire-extinguishing agent, and a commercially available product can be used as the fire extinguisher 26.

A trash storage space of which the upper portion is opened is included inside the waste container 34, and the waste container 34 is disposed in a storage position that is positioned relative to the lower portion of the chute 30A. When the waste container 34 is in the storage position, trash fed from the trash feed port 2204 is stored in the trash storage space.

The waste container 34 can be removed from the storage chamber 2002.

At least the upper portion of the waste container 34 is formed in a shape corresponding to the bottom plate portion 3002 of the chute 30A. in the present embodiment, the waste container 34 has a rectangular cross section and has a uniform shape in the vertical direction.

Note that when the shape of the bottom plate portion 3002 of the chute 30A is semi-circular, at least the upper portion of the waste container 34 is also semi-circular. the shapes of the bottom plate portion 3002 of the chute 30A and the waste container 34 are not limited to rectangular shapes, and may be other shapes other than rectangular. Such a change in shape applies to other embodiments.

In addition, the cross-sectional shape of the waste container 34 need not be uniform in the vertical direction, for example, in order to avoid interference with the equipment disposed in the storage chamber 2002, optionally, a recessed portion that is recessed inward of the waste container 34 can be provided at the lower portion of the waste container 34. The same applies to other embodiments.

Figure 8:
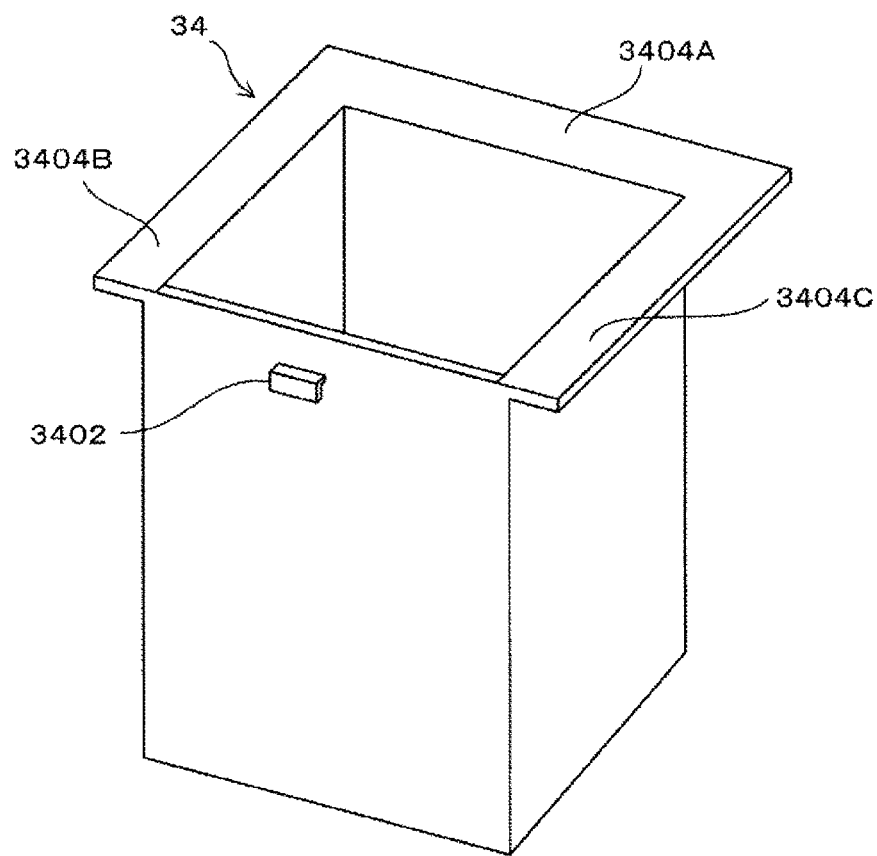
FIG. 8 is a perspective view of a waste container according to the first embodiment.

As illustrated in FIG. 8, the waste container 34 is provided with, on the side surface disposed close to the opening/closing plate 22, a handle 3402 for pulling.

Except for the side surface disposed close to the opening/closing plate 22, a back flange 3404 A, a left flange 3404 B, and a right flange 3404 C, which detachably engage with the rear groove 3008A, the left groove 3008B, and the right groove 3008C, are formed on the upper portions of the three remaining side surfaces.

Figure 3:
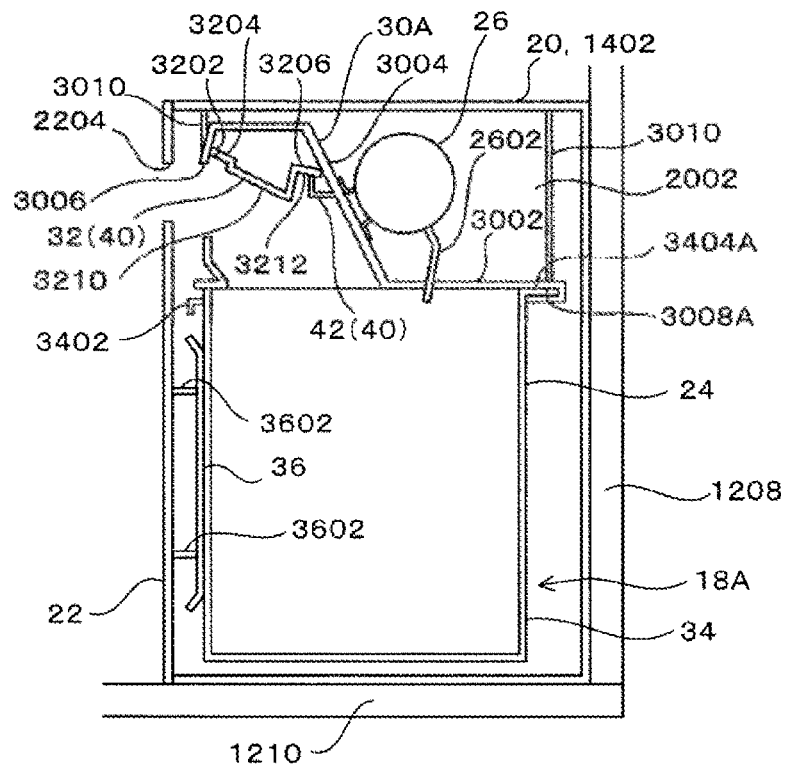
FIG. 3 is a cross-sectional side view of the trash can device according to the first embodiment, illustrating a state in which a waste flap is in an open position.

As illustrated in FIG. 3, a pressing plate 36 is provided on the back surface of the opening/closing plate 22. In a state when the storage chamber 2002 is closed by the opening/closing plate 22. the back surface of the opening/closing plate 22 is positioned on the storage chamber 2002 side, and the pressing plate 36 presses on the side surface of the waste container 34 and pushes the waste container 34 to the portion of the chute 30A that forms the rear groove 3008A.

The pressing plate 36 is supported by tip portions of a plurality of rods 3602 attached to the back surface of the opening/closing plate 22.

The insertion and removal of the waste container 34 into and from the storage chamber 2002 will be described.

First, a case in which the waste container 34 is being inserted into the storage chamber 2002 will be described.

The engaging/disengaging mechanism 2210 is released to open the opening/closing plate 22, then, the left flange 3404B and the right flange 3404C are inserted into the left groove 3008B and the right groove 3008C, and the waste container 34 is inserted into the storage chamber 2002.

Eventually, the back flange 3404A is inserted into the rear groove 3008A, and the portion of the chute 30A forming the back groove 3008A abuts the upper end of the side surface of the waste container 34, meaning the waste container 34 is in the storage position.

When the waste container 34 is in the storage position, the upper end of the surface of the waste container 34 disposed close to the opening/closing plate 22 is aligned with the lower surface of the bottom plate portion 3002 of the chute 30A. That is, when the waste container 34 is in the storage position, the upper end of the surface of the waste container 34 disposed close to the opening/closing plate 22 abuts or is close to the lower surface of the bottom plate portion 3002 of the chute 30A. Here, "close to" means that the upper end of the surface of the waste container 34 faces the lower surface of the bottom plate portion 3002 of the chute 30A having sufficient hermeticity to satisfy the Fire Containment requirements specified in United States Federal Aviation Regulations (FAR) 25.853.

When the waste container 34 is in such a storage position, and the waste flap 32 is in the closed position described below, a fire spreading prevention space 38 (see FIG. 5), which prevents fire from spreading to outside of the trash can device body 24 when trash fed into the trash can device body 24 burns, is formed inside the trash can device body 24, or in other words, below the chute 30A.

Next, the storage chamber 2002 is closed by the opening/closing plate 22.

When the storage chamber 2002 is closed by the opening/closing plate 22, the pressing plate 36 presses the side surface of the waste container 34. When the storage chamber 2002 is held closed by the opening/closing plate 22, the portion of the chute 30A that forms the rear groove 3008A is held abutting to the upper end of the surface of the waste container 34 provided with the back flange 3404A due to the pressing plate 36.

Removal of the waste container 34 from the storage chamber 2002 is done by releasing the engaging/disengaging mechanism 2210 to open the opening/closing plate 22 and pulling the waste container 34 forward.

Next, the waste flap 32 and a holding/moving portion 40 will be described.

The waste flap 32 opens and closes the trash feed opening 3006.

Figure 9:
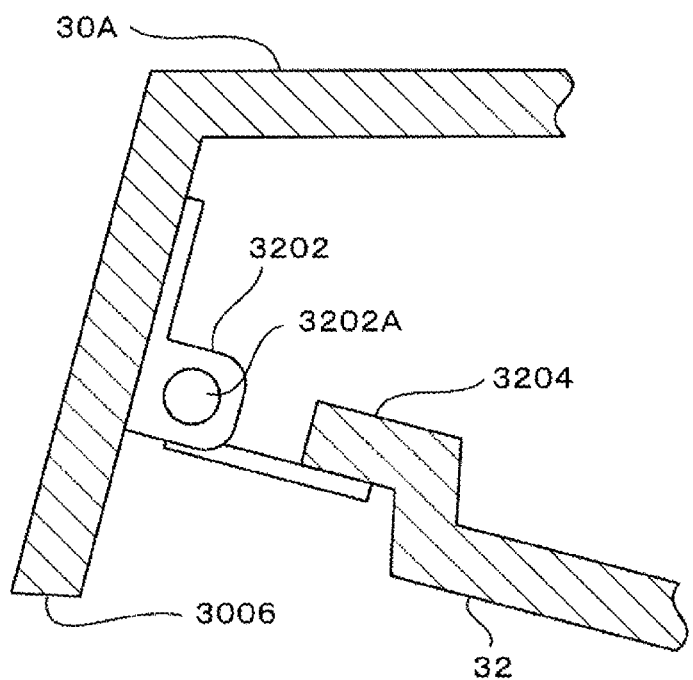
FIG. 9 is a cross-sectional view of a connecting portion between a base end of the waste flap and a chute according to the first embodiment, illustrating a state in which the waste flap is in the open position.
Figure 10:
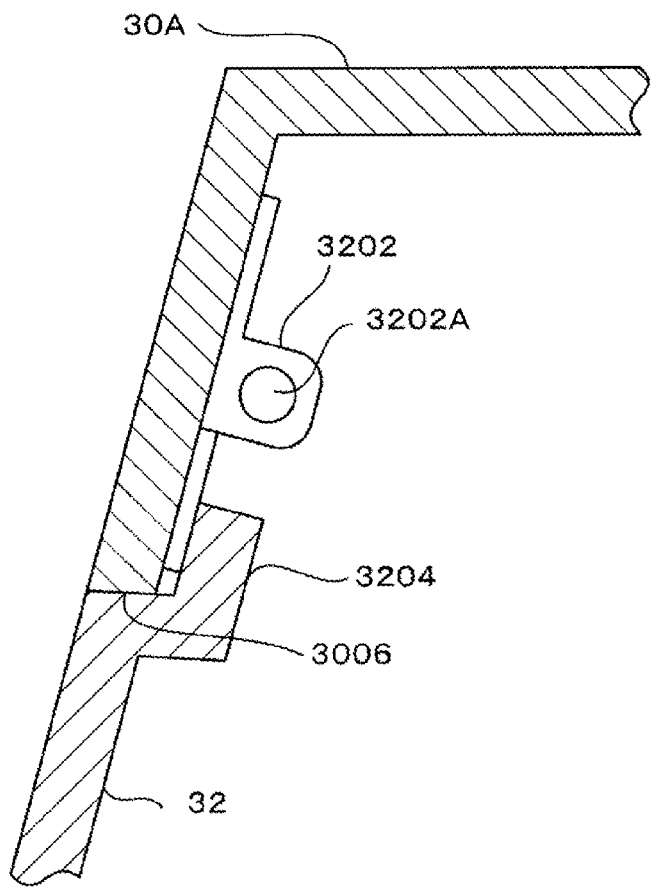
FIG. 10 is a cross-sectional view of the connecting portion between the base end of the waste flap and the chute according to the first embodiment, illustrating a state in which the waste flap is in the closed position.

As shown in FIGS. 3, 9 and 10, the waste flap 32 is supported by a hinge 3202 on the upper portion of the trash feed opening 3006 in a manner that a base end 3204 of the waste flap 32 is swingable. In FIGS. 9 and 10, the reference sign 3202A denotes the support shaft of the hinge 3202.

Figure 4:
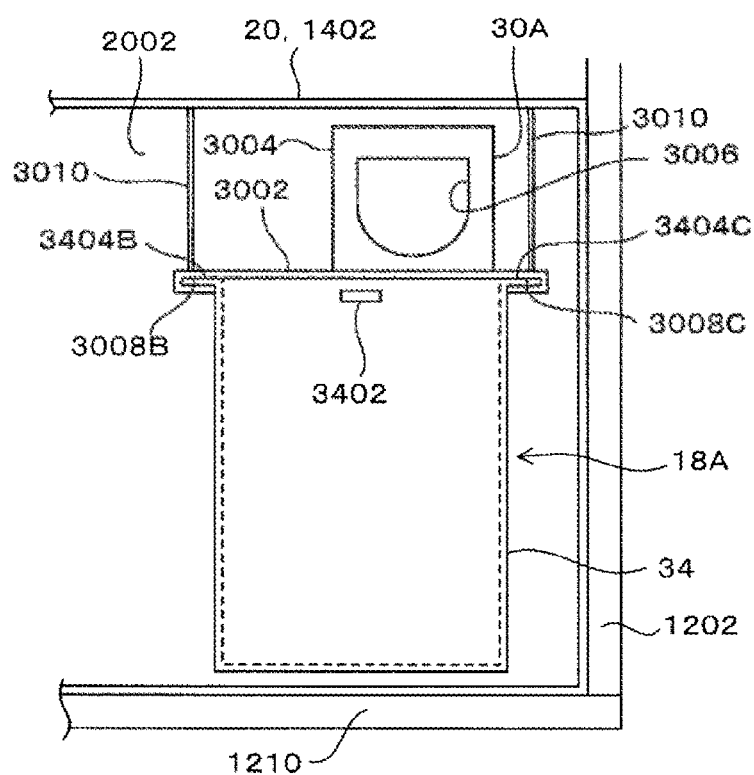
FIG. 4 is a front view of the trash can device according to the first embodiment, illustrating a state in which the waste flap is in the open position.

As illustrated in FIGS. 3 and 4, when the waste flap 32 is in an open position, a free end 3206 of the waste flap 32 which is opposite the base end 3204 is away from the trash feed opening 3006, opening the trash feed opening 3006.

Figure 5:
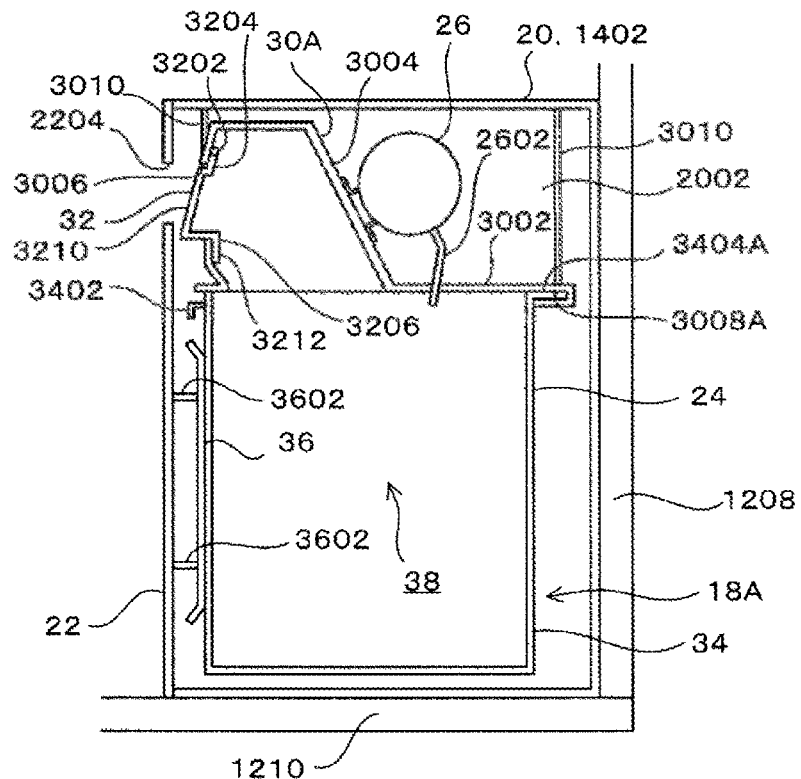
FIG. 5 is a cross-sectional side view of the trash can device according to the first embodiment, illustrating a state in which the waste flap is in a closed position.
Figure 6:
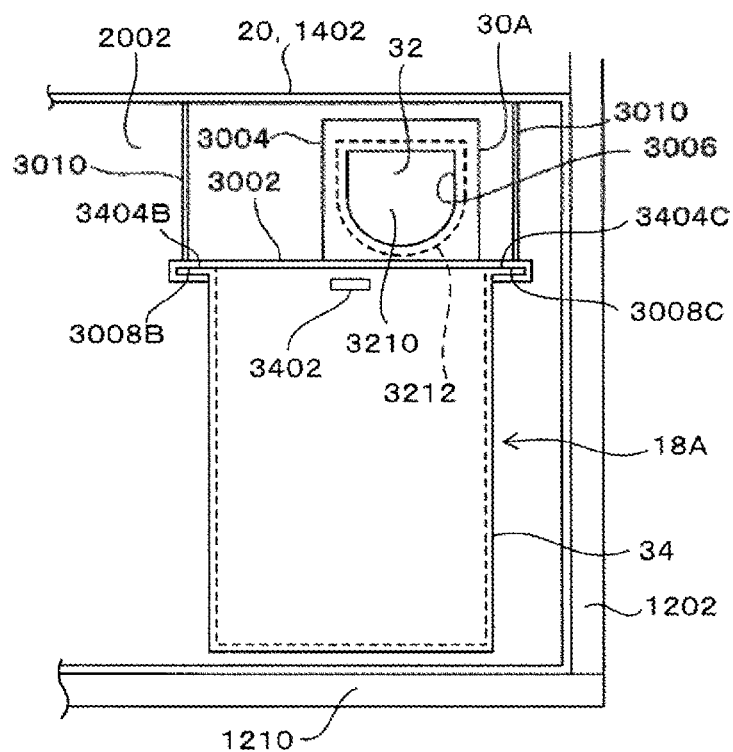
FIG. 6 is a front view of the trash can device according to the first embodiment, illustrating a state in which the waste flap is in the closed position.

As illustrated in FIGS. 5 and 6, when the waste flap 32 is in a closed position, the free end 3206 assumes a position that is below the base end 3204 due to the empty weight of the waste flap 32, closing the trash feed opening 3006.

Note that in the present embodiment, as illustrated in FIG. 5, the waste flap 32 has a shape including a flange 3212 and a protrusion portion 3210. When the waste flap 32 is in the closed position, the protrusion portion 3210 enters the inside of the trash feed opening 3006, and the flange 3212 comes into contact with or close to the chute portion in the periphery of the trash feed opening 3006. However, the waste flap 32 may be flat or the like. In short, the waste flap 32 may have any shape as long as it can open and close the trash feed opening 3006.

As illustrated in FIG. 3, the holding/moving portion 40 holds the waste flap 32 in the open position in which the trash feed opening 3006 is opened, meanwhile, as illustrated in FIG. 5, the holding/moving portion 40 moves the waste flap 32 to the closed position when exposed to heat.

In the present embodiment, the holding/moving portion 40 includes the waste flap 32 and a locking member 42.

The locking member 42 is provided at the section of the projection portion 3004 of the chute 30A facing the trash feed opening 3006.

The locking member 42 is locked to the free end 3206 of the waste flap 32 at the open position of the waste flap 32, and holds the waste flap 32 in the open position, meanwhile, the locking member 42 releases the locking of the free end 3206 of the waste flap 32 when exposed to heat.

The locking member 42 is formed of a material whose shape changes due to heat of the inside of the trash can device body 24, when a set temperature of the inside of the trash can device body 24 is reached or exceeded in a state in which the trash feed opening 3006 is open.

As such a material, a material which is melted by heat, a material whose strength is reduced by heat, or a material which is deformed by heat can be used.

Various known low melting point alloys containing lead, zinc, tin, indium, gallium, bismuth, and the like as a main component can be used as the material which is melted by heat.

When a material which is melted by heat is used as the locking member 42, in the open position of the waste flap 32 illustrated in FIG. 3, the locking member 42 has a shape that is locked to the free end 3206 of the waste flap 32. And as illustrated in FIG. 5, when exposed to heat, the locking member 42 melts and disappears from the projection portion 3004 of the chute 30A, releasing the locking of the free end 3206 of the waste flap 32.

In addition, various known thermoplastic resins such as polyethylene, polypropylene can be used as the material whose strength is reduced by heat.

Figure 11:
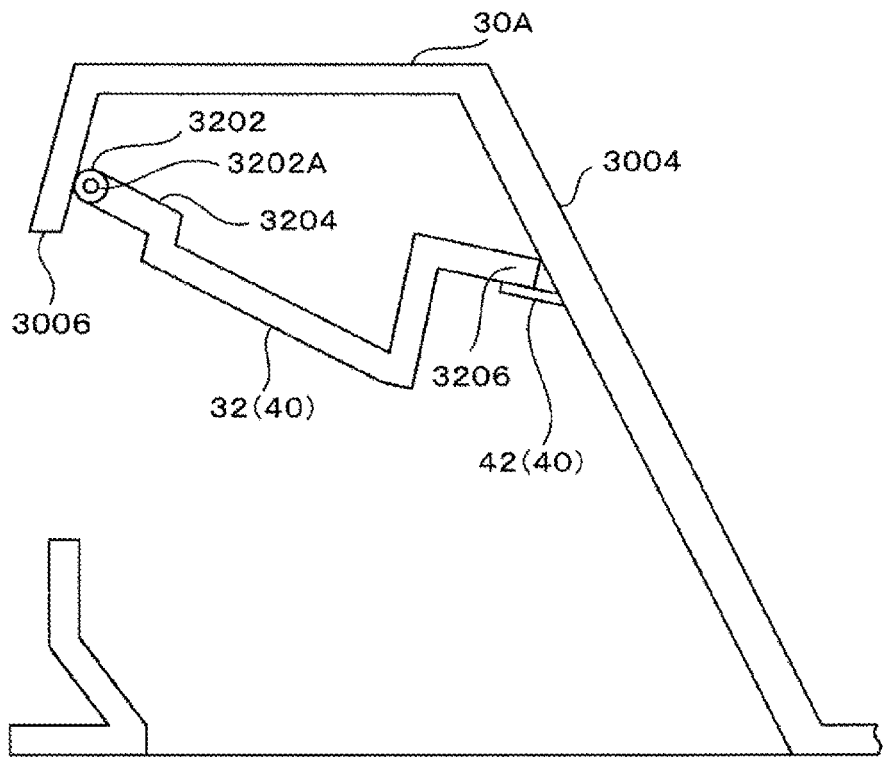
FIG. 11 is a partial cross-sectional view illustrating a state in which the waste flap according to the first embodiment is in the open position, in which a material whose strength is reduced by heat is used as a locking member.
Figure 12:
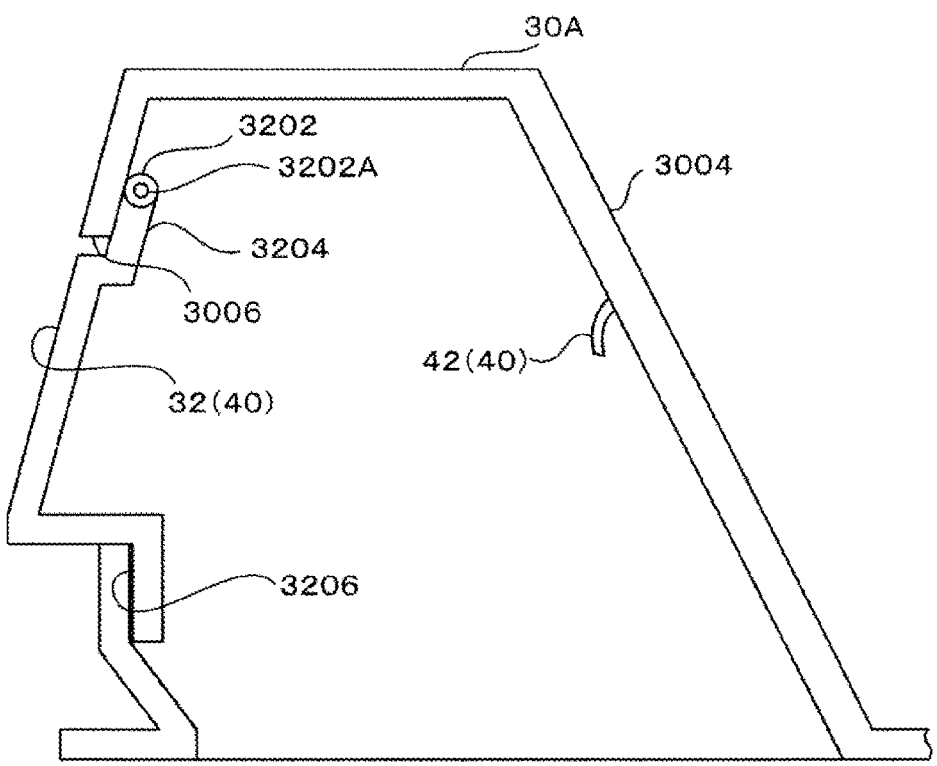
FIG. 12 is a partial cross-sectional view illustrating a state in which the waste flap according to the first embodiment is in the closed position, illustrating a case where a material whose strength is reduced by heat is used as the locking member.

When a material whose strength is reduced by heat is used as the locking member 42, in the open position of the waste flap 32 illustrated in FIG. 11, the locking member 42 has a shape that is locked to the free end 3206 of the waste flap 32. As illustrated in FIG. 12, when exposed to heat, the locking member 42 deforms, releasing the locking of the free end 3206 of the waste flap 32.

Figure 13:
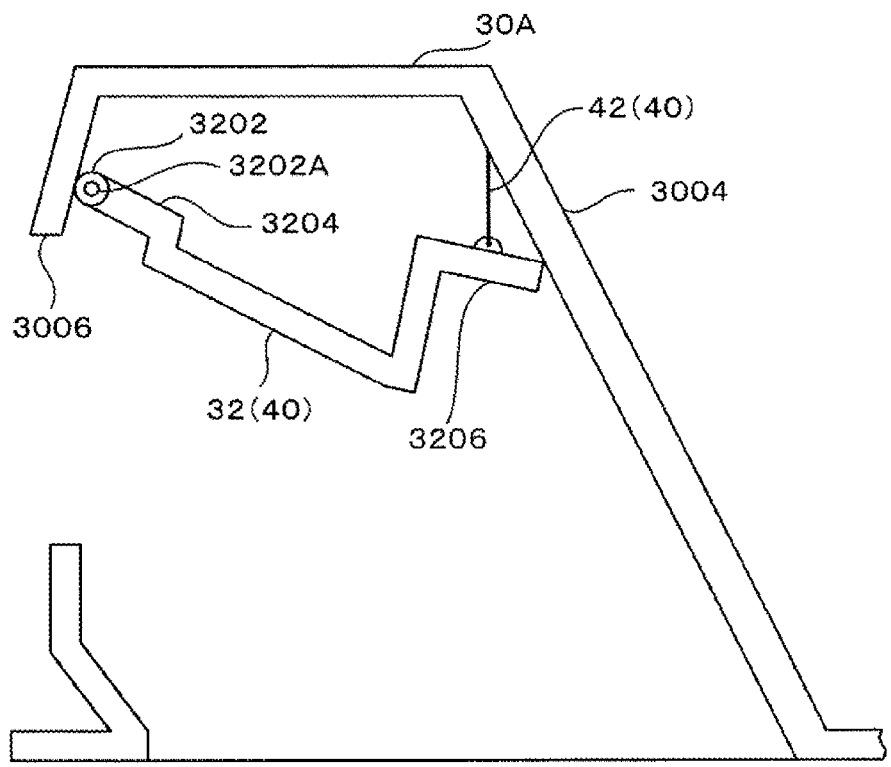
FIG. 13 is a partial cross-sectional view illustrating a state in which the waste flap according to the first embodiment is in the open position, illustrating a case where a thread whose strength is reduced by heat is used as the locking member.
Figure 14:
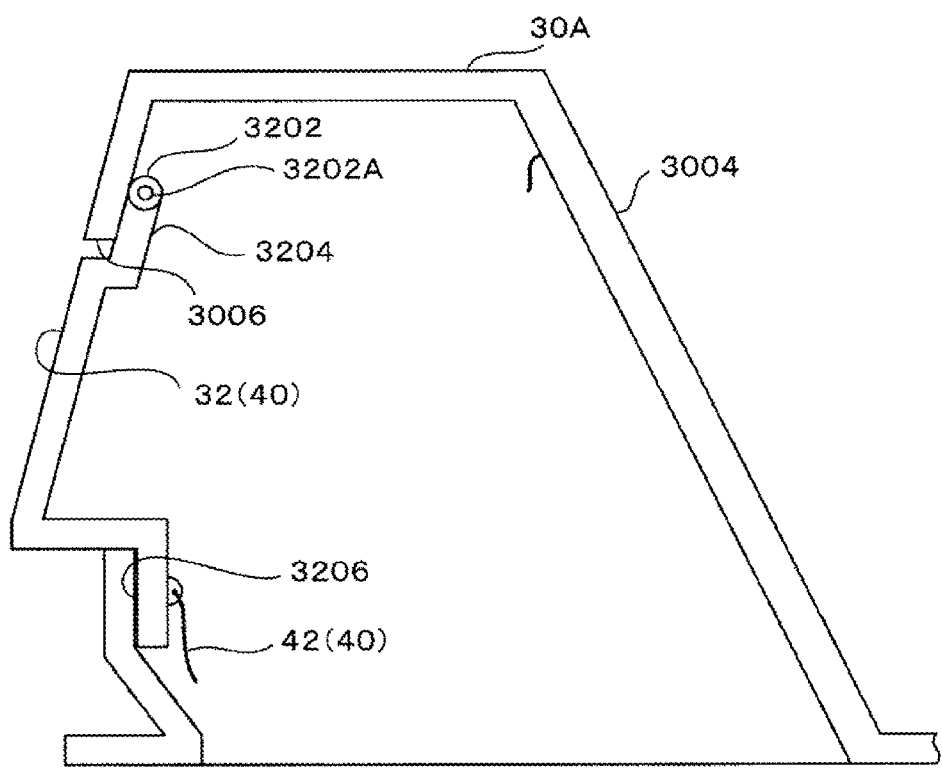
FIG. 14 is a partial cross-sectional view illustrating a state in which the waste flap according to the first embodiment is in the closed position, illustrating a case where a thread whose strength is reduced by heat is used as the locking member.

Also, when thread made of cotton or synthetic resin that breaks due to heat is used as the material whose strength is reduced by heat, in the open position of the waste flap 32 illustrated in FIG. 13, the locking member 42 pulls the free end 3206 of the waste flap 32 up. As illustrated in FIG. 14, when exposed to heat, the locking member 42 breaks, releasing the locking of the free end 3206 of the waste flap 32.

In addition, various known materials such as shape memory alloy, bimetal can be used as the material which is deformed by heat.

Figure 15:
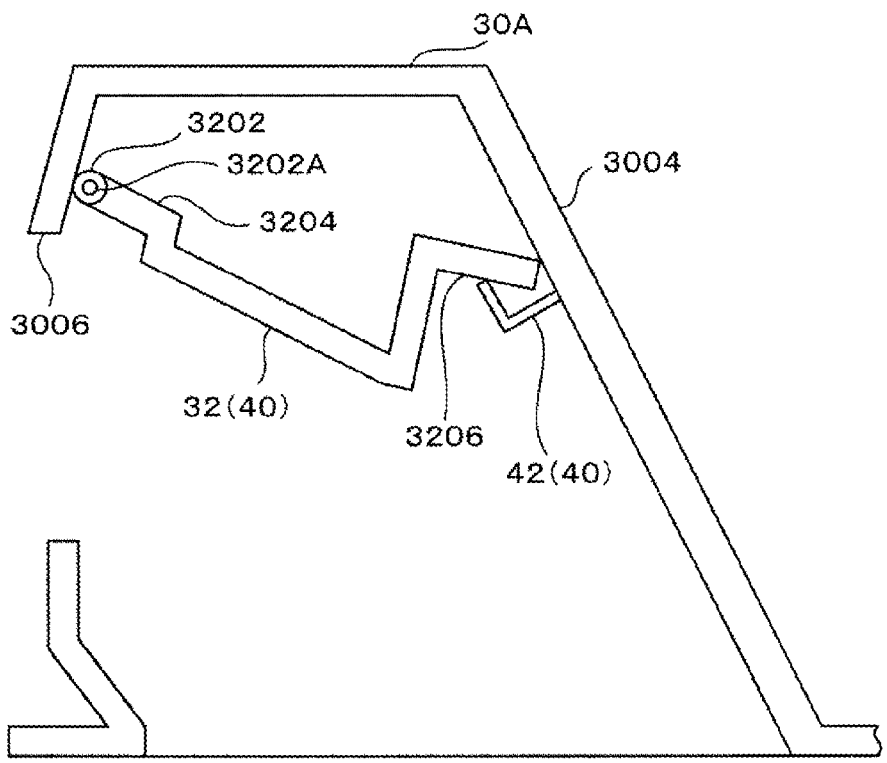
FIG. 15 is a partial cross-sectional view illustrating a state in which the waste flap according to the first embodiment is in the open position, illustrating a case where a material which is deformed by heat is used as the locking member.
Figure 16:
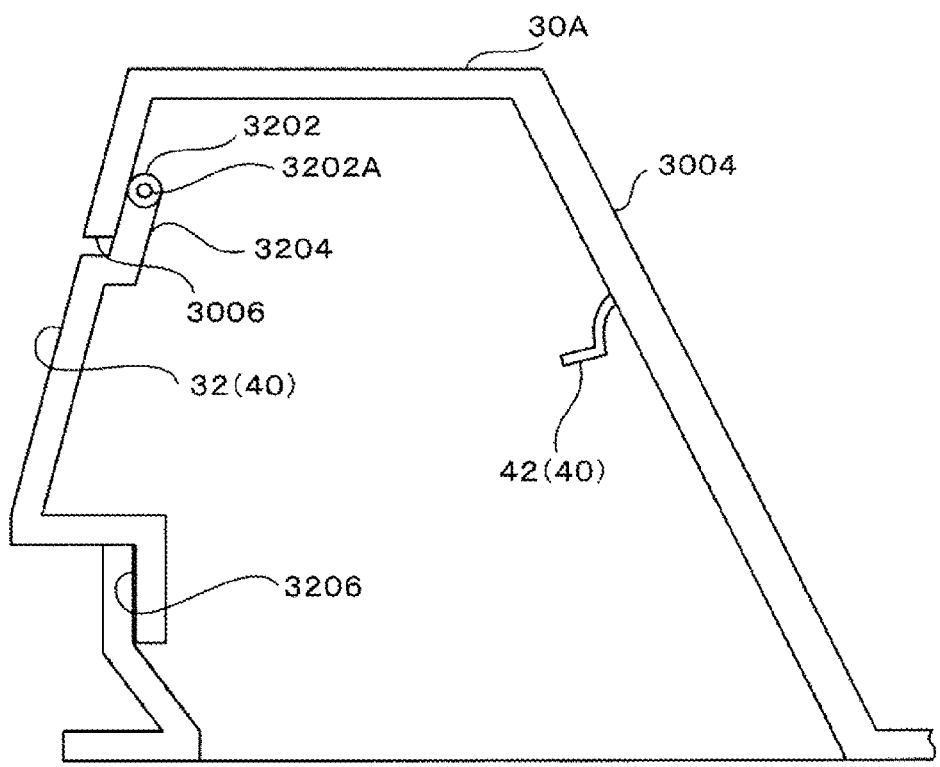
FIG. 16 is a partial cross-sectional view illustrating a state in which the waste flap according to the first embodiment is in the closed position, illustrating a case where a material which is deformed by heat is used as the locking member.

When a material which is deformed by heat is used as the locking member 42, in the open position of the waste flap 32 illustrated in FIG. 15, the locking member 42 has a shape that is locked to the free end 3206 of the waste flap 32. As illustrated in FIG. 16, when exposed to heat, the locking member 42 deforms, releasing the locking of the free end 3206 of the waste flap 32.

According to the first embodiment, the following effects are achieved.

The waste flap 32 is held in the open position by the locking member 42. That is, the waste flap 32 is held in the open position by the holding/moving portion 40.

As a result, a user is able to feed trash from the trash feed port 2204 and the trash feed opening 3006 without touching the waste flap 32.

Also, when a set temperature of the inside of the trash can device body 24 is reached or exceeded, the locking member 42 is exposed to the heat of the inside of the trash can device body 24 and deforms, and the locking of the free end 3206 of the waste flap 32 by the locking member 42 is released. Accordingly, the waste flap 32 swings from the open position due to the empty weight of the waste flap 32, and the free end 3206 assumes a position that is below the base end 3204. Thus, the waste flap 32 assumes the closed position in which the trash feed opening 3006 is closed. This closed position is held by the empty weight of the waste flap 32.

That is, the waste flap 32 is moved from the open position to the closed position by the holding/moving portion 40.

In this way, a fire spreading prevention space 38 is formed below the chute 30A, satisfying the Fire Containment requirements specified in United States Federal Aviation Regulations (FAR) 25.853.

Thus, according to the first embodiment, the trash can device 18A for the aircraft lavatory unit 10 that allows a user to feed trash from the trash feed opening 3006 to the trash storage space without touching the waste flap 32 while satisfying the Fire Containment requirements specified in United States Federal Aviation Regulations (FAR) 25.853 is obtained.

In addition, according to the first embodiment, the locking member 42 deforms due to heat, releasing the locking of the waste flap 32, then, the waste flap 32 changes from the open position to the closed position due to the empty weight of the waste flap 32, and this closed position is held by the empty weight of the waste flap 32. This is advantageous in simplifying the configuration of the holding/moving portion 40.

Figure 17:
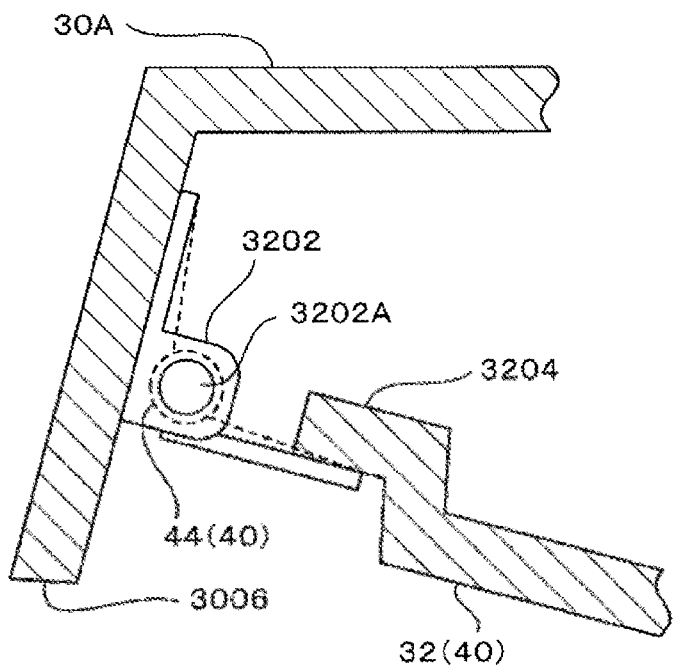
FIG. 17 is a cross-sectional view of a connecting portion between a base end of a waste flap and a chute according to a second embodiment, illustrating a state in which a waste flap is in an open position.
Figure 18:
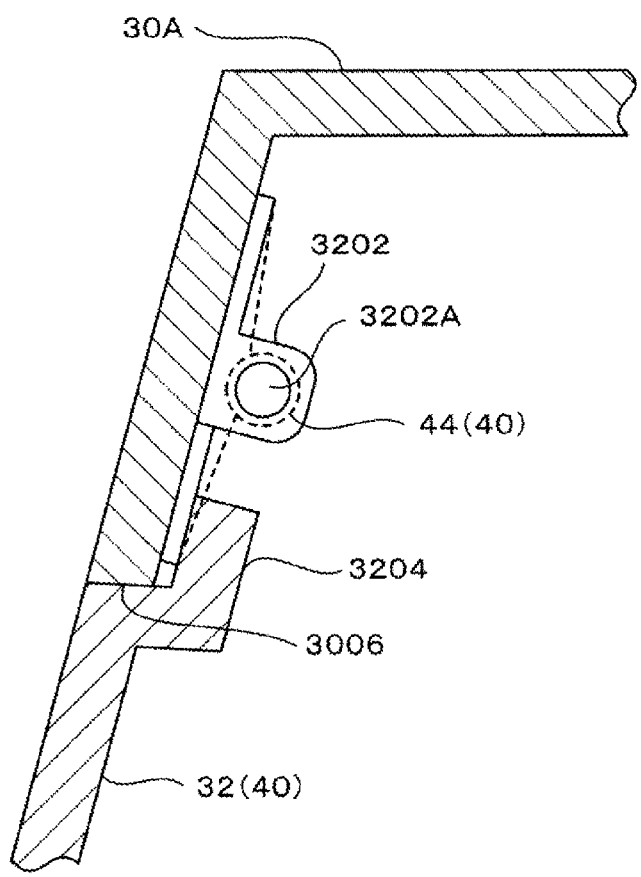
FIG. 18 is a cross-sectional view of the connecting portion between the base end of the waste flap and the chute according to the second embodiment, illustrating a state in which the waste flap is in a closed position.

Next, an aircraft lavatory unit 10 according to a second embodiment will be explained with reference to FIGS. 17 and 18.

Note that in the following embodiments, since the configuration of a holding/moving portion 40 is different from that of the first embodiment, the description will focus on the different sections, and the sections and members that are same with the first embodiment will be denoted by identical reference signs and the description thereof are omitted.

The second embodiment is, in addition to the first embodiment, provided with an elastic member that biases the waste flap 32 into the closed position.

In the present embodiment, a torsion spring 44 is used as the elastic member.

The torsion spring 44 is provided on the base end 3204 of the waste flap 32 to bias the waste flap 32 into the closed position.

Specifically, the torsion spring 44 which biases the waste flap 32 into the closed position is wound on the support shaft 3202A of the hinge 3202.

In the second embodiment, the holding/moving portion 40 includes the waste flap 32, the locking member 42, and the torsion spring 44 (elastic member).

According to the second embodiment, the waste flap 32 is held in the open position by the locking member 42, that is, the waste flap 32 is held in the open position by the holding/moving portion 40. Thus, a user can feed trash from the trash feed port 2204 and the trash feed opening 3006 without touching the waste flap 32.

In addition, in a state in which the trash feed opening 3006 is open, when a set temperature of the inside of the trash can device body 24 is reached or exceeded, the locking member 42 is exposed to the heat of the inside of the trash can device body 24 and deforms, and the locking of the free end 3206 of the waste flap 32 by the locking member 42 is released. Thus, the waste flap 32 swings from the open position due to the elastic force of the torsion spring 44 and the empty weight of the waste flap 32. The free end 3206 comes to be below the base end 3204, and the waste flap 32 assumes the closed position in which the base end 3204 and the free end 3206 extend in the vertical direction to close the trash feed opening 3006. This closed position is held by the empty weight of the waste flap 32 and the elastic force of the torsion spring 44.

In this case, unlike in the first embodiment, the elastic force of the torsion spring 44 biases the waste flap 32 into the closed position.

That is, the waste flap 32 is moved from the open position to the closed position by the holding/moving portion 40 and is biased to remain in the closed position.

In this way, the fire spreading prevention space 38 is formed below the chute 30A, satisfying the Fire Containment requirements specified in United States Federal Aviation Regulations (FAR) 25.853.

Thus, according to the second embodiment, as in the first embodiment, the trash can device for the aircraft lavatory unit 10 that allows a user to feed trash from the trash feed opening 3006 to the trash storage space without touching the waste flap 32 while satisfying the Fire Containment requirements specified in United States Federal Aviation Regulations (FAR) 25.853 is obtained.

In addition, according to the second embodiment, it is advantageous to reliably hold the waste flap 32 in the closed position by the torsion spring 44.

Note that the elastic member is not limited to the torsion spring 44, and various known elastic members such as leaf springs, coil springs, gas springs can be used as the elastic member. The arrangement structure of the elastic member varies depending on the elastic member to be used.

Next, a lavatory unit 10 according to a third embodiment will be explained with reference to FIGS. 19 to 22.

Figure 21:
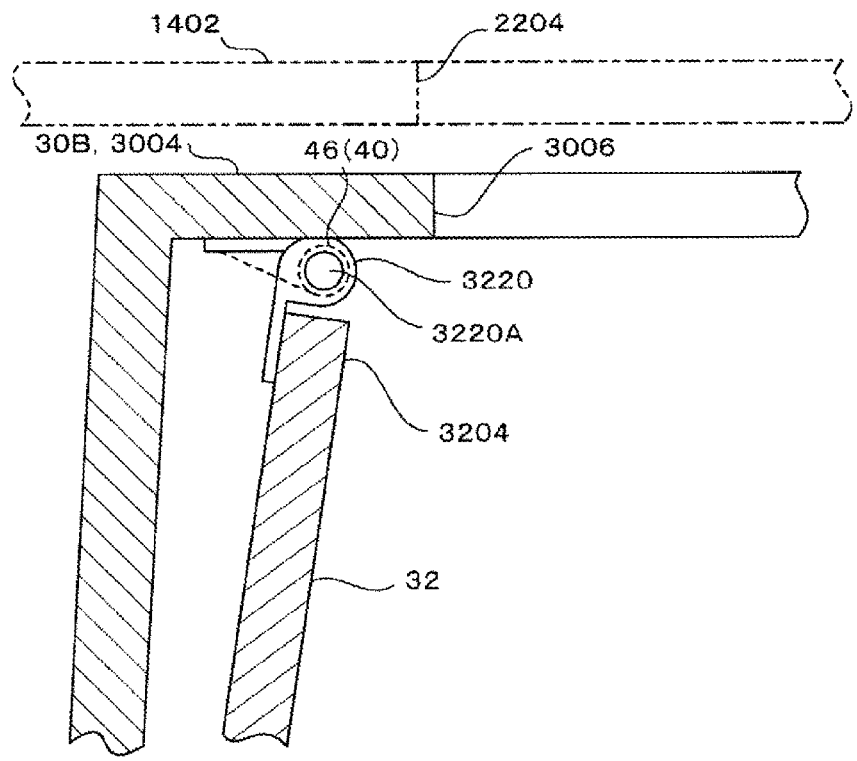
FIG. 21 is a cross-sectional view of a connecting portion between a base end of the waste flap and a chute according to the third embodiment, illustrating a state in which the waste flap is in the open position.

The third embodiment differs from the first embodiment in that, as illustrated in FIG. 21, the trash feed opening 3006 is provided on an upper surface of the projection portion 3004 of a chute 30B, the upper surface being parallel to the floor of the aircraft lavatory unit 10, and that the holding/moving portion 40 includes an elastic member and a locking member 48.

In the third embodiment, the trash feed port 2204 is provided on the upper surface of the counter 1402 beside the sink basin 1404. In other words, the trash feed port 2204 is provided on the upper surface of a horizontal panel that is parallel to the floor of the lavatory unit 10 and is provided on a surface that is parallel to the floor of the lavatory unit 10.

In addition, the trash feed opening 3006 is positioned below the trash feed port 2204, and the trash feed opening 3006 is provided on the upper surface of the projection portion 3004 of the chute 30B, the upper surface being parallel to the floor of the aircraft lavatory unit 10.

Figure 22:
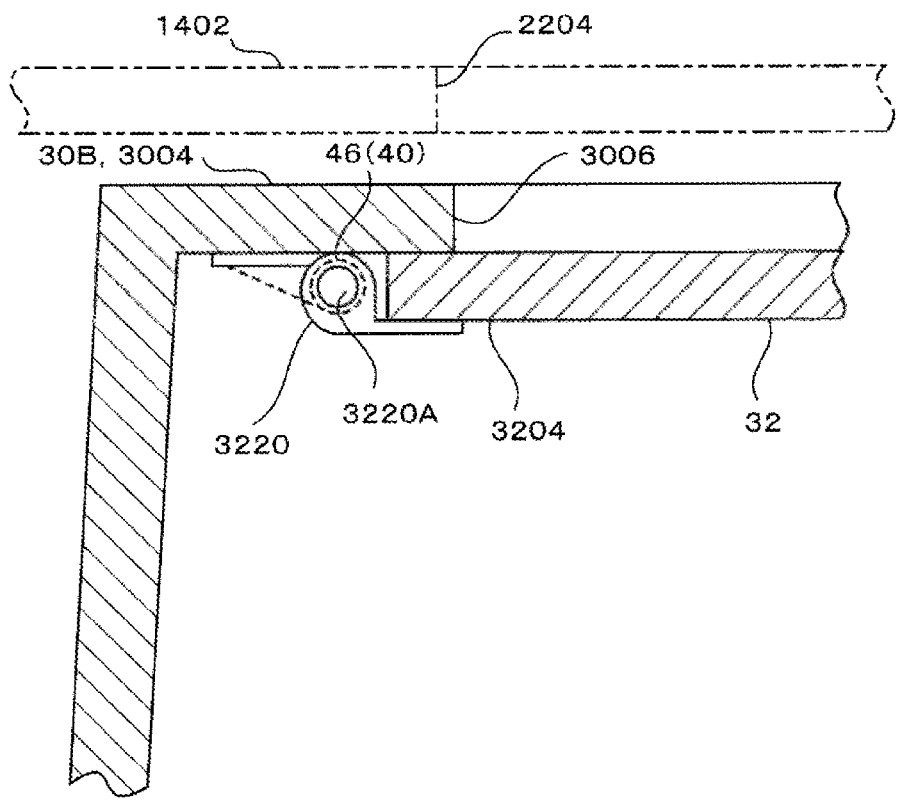
FIG. 22 is a cross-sectional view of the connecting portion between the base end of the waste flap and the chute according to the third embodiment, illustrating a state in which the waste flap is in the closed position.

The waste flap 32 is supported by a hinge 3220 on the edge portion of the trash feed opening 3006 in a manner that the base end 3204 of the waste flap 32 is swingable. In FIGS. 21 and 22, the reference sign 3220A denotes the support shaft of the hinge 3220.

Figure 19:
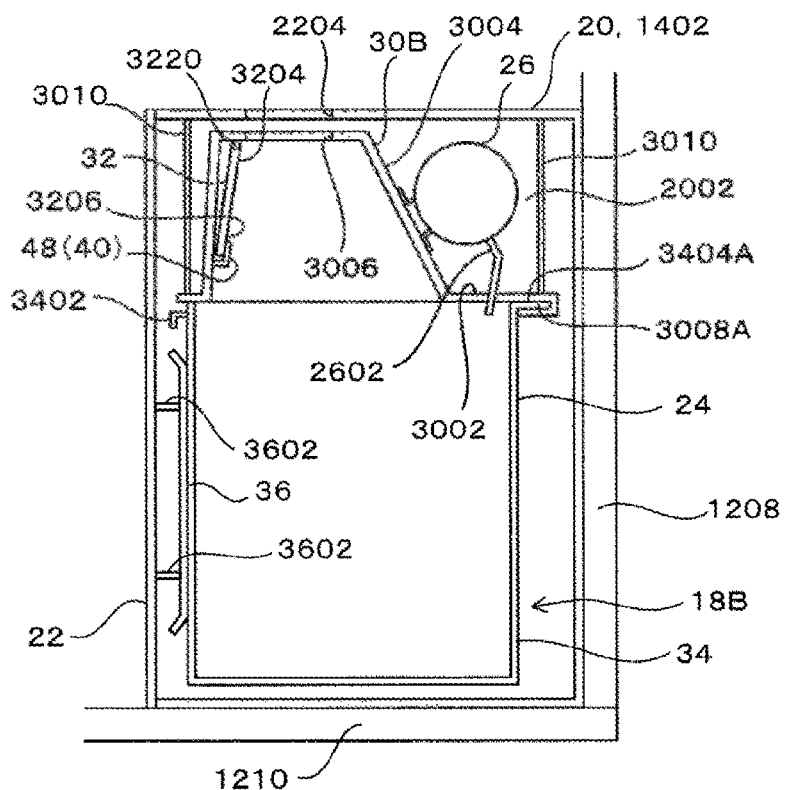
FIG. 19 is a cross-sectional side view of a trash can device according to a third embodiment, illustrating a state in which a waste flap is in an open position.

As shown in FIG. 19, when the waste flap 32 is in the open position, the free end 3206 of the waste flap 32 which is opposite the base end 3204 is away from the trash feed opening 3006 in the downward direction, opening the trash feed opening 3006.

Figure 20:
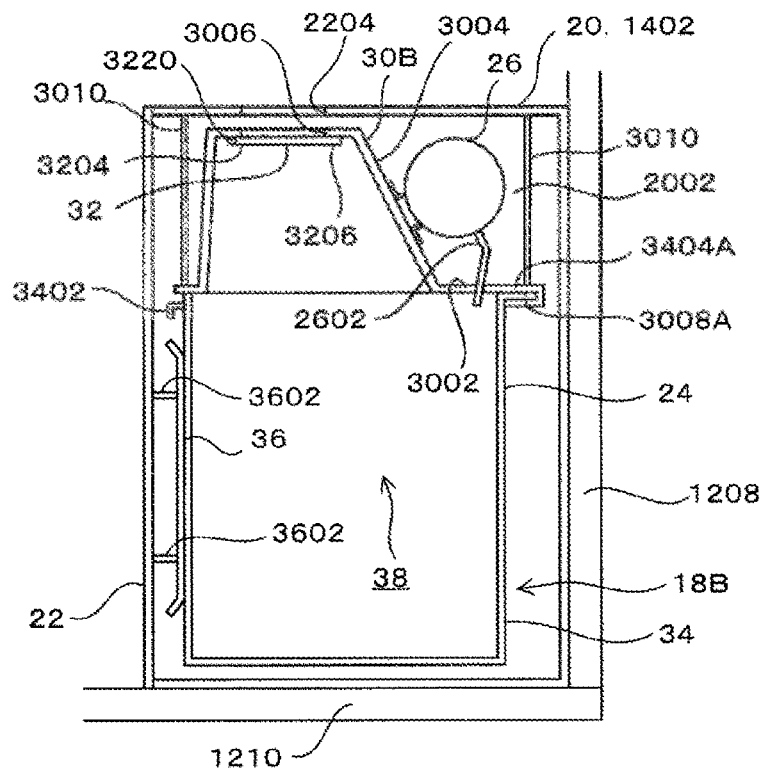
FIG. 20 is a cross-sectional side view of the trash can device according to the third embodiment, illustrating a state in which the waste flap is in a closed position.

Also, as shown in FIG. 20, when the waste flap 32 is in the closed position, the waste flap 32 assumes a position that is parallel to the upper surface of the projection portion 3004 and comes into contact with or close to the upper surface of the projection portion 3004, closing the trash feed opening 3006.

As illustrated in FIG. 19, the holding/moving portion 40 holds the waste flap 32 in the open position in which the trash feed opening 3006 is opened; meanwhile, as illustrated in FIG. 20, the holding/moving portion 40 moves the waste flap 32 to the closed position when exposed to heat.

As illustrated in FIGS. 19 to 22, in the present embodiment, the holding/moving portion 40 includes an elastic member that biases the waste flap 32 into the closed position and the locking member 48, and in the present embodiment, a torsion spring 46 is used as the elastic member.

The torsion spring 46 is provided on the base end 3204 of the waste flap 32 to bias the waste flap 32 into the closed position.

Specifically, the torsion spring 46 which biases the waste flap 32 into the closed position is wound on the support shaft 3220A of the hinge 3220.

The locking member 48 is provided on the side surface of the projection portion 3004 of the chute 30B.

When the waste flap 32 is in the open position, the locking member 48 is locked to the free end 3206 of the waste flap 32 and holds the waste flap 32 in the open position, meanwhile, the locking member 48 releases the locking of the free end 3206 of the waste flap 32 when exposed to heat.

The locking member 48 is formed of a material whose shape changes due to heat of the inside of the trash can device body 24, when a set temperature of the inside of the trash can device body 24 is reached or exceeded in a state in which the trash feed opening 3006 is open. The locking member 48 is formed of the same material as that of the locking member 42 according to the first embodiment.

According to the third embodiment, the waste flap 32 is held in the open position by the locking member 48, that is, the waste flap 32 is held in the open position by the holding/moving portion 40. Thus, a user can feed trash from the trash feed port 2204 and the trash feed opening 3006 without touching the waste flap 32.

In addition, when a set temperature of the inside of a trash can device body 24 is reached or exceeded, the locking member 48 is exposed to the heat of the inside of a trash can device body 24 and deforms, and the locking of the free end 3206 of the waste flap 32 by the locking member 48 is released. Thus, the waste flap 32 swings from the open position to the closed position due to the elastic force of the torsion spring 46. This closed position is held by the elastic force of the torsion spring 46.

In this way, the fire spreading prevention space 38 is formed below the chute 30B, satisfying the Fire Containment requirements specified in United States Federal Aviation Regulations (FAR) 25.853.

Thus, according to the third embodiment, as in the first embodiment, the trash can device 18B for the aircraft lavatory unit 10 that allows a user to feed trash from the trash feed opening 3006 to the trash storage space without touching the waste flap 32 while satisfying the Fire Containment requirements specified in United States Federal Aviation Regulations (FAR) 25.853 is obtained.

Note that the elastic member is not limited to the torsion spring 46, and various known elastic members such as leaf springs can be used as the elastic member. The arrangement structure of the elastic member varies depending on the elastic member to be used.

Next, a lavatory unit 10 according to a fourth embodiment will be explained with reference to FIGS. 23 and 24.

The fourth embodiment differs from the first embodiment in that the holding/moving portion 40 includes an actuator 50, a sensor 52, and a control unit 54.

Figure 23:
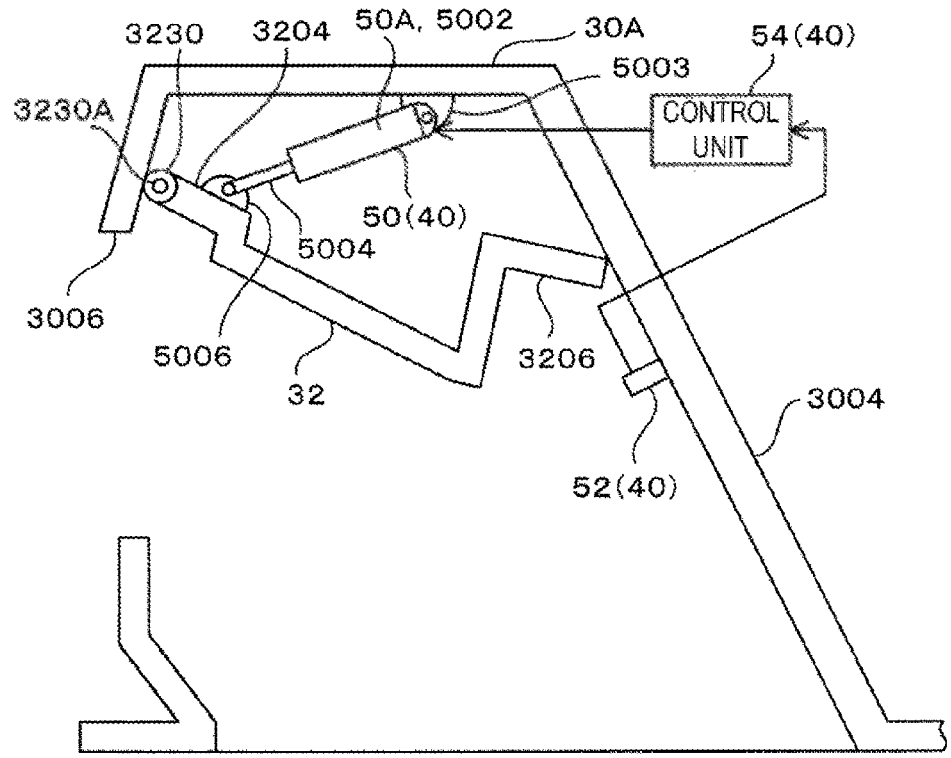
FIG. 23 is a partial cross-sectional view illustrating a state in which a waste flap according to a fourth embodiment is in an open position.

As shown in FIG. 23, the waste flap 32 is supported by a hinge 3230 on the upper portion of a trash feed opening 3006 in a manner that the base end 3204 of the waste flap 32 is swingable, and in FIG. 23 the reference sign 3230A denotes the support shaft of the hinge 3230.

As shown in FIG. 23, when the waste flap 32 is in the open position, the free end 3206 of the waste flap 32 which is opposite the base end 3204 is away from the trash feed opening 3006, opening the trash feed opening 3006.

Figure 24:
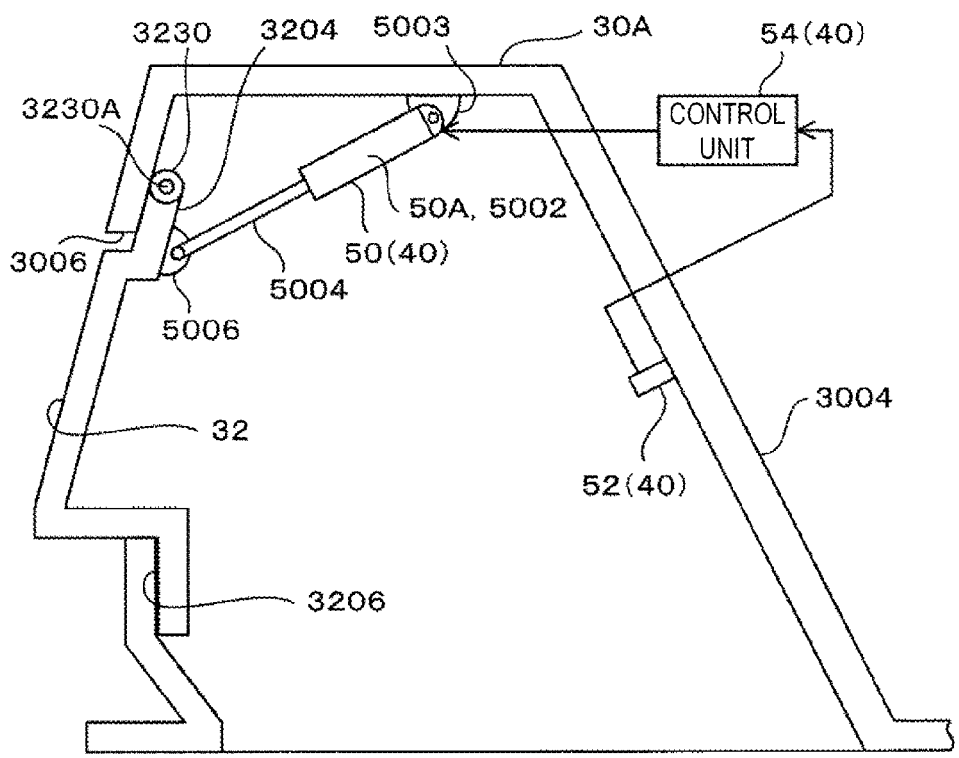
FIG. 24 is a partial cross-sectional view illustrating a state in which the waste flap according to the fourth embodiment is in a closed position.

Also, as shown in FIG. 24, the trash feed opening 3006 is closed when the waste flap 32 is in the closed position.

The holding/moving portion 40 includes the actuator 50, the sensor 52, and the control unit 54.

The actuator 50 is, for example, an electric cylinder 50A, with a base portion of a cylinder 5002 swingably joined to an upper portion of a projection portion 3004 by a flange 5003 and a tip end of a rod 5004 swingably joined to a back surface of the waste flap 32 by a flange 5006.

As illustrated in FIG. 23, when the electric cylinder 50A is contracted, the waste flap 32 is in the open position. As illustrated in FIG. 24, when the electric cylinder 50A is extended, the waste flap 32 is in the closed position.

The sensor 52 senses heat and is provided, for example, inside the projection portion 3004.

Various known thermal sensors such as thermistors, bimetal sensors, temperature-sensitive reed switches can be used as the sensor 52.

The control unit 54 actuates the electric cylinder 50A in sensing heat by the sensor 52. The electric cylinder 50A is contracted at a normal temperature, and when the temperature sensed by the sensor 52 reaches or exceeds a set temperature, the control unit 54 extends the electric cylinder 50A. Thus, the waste flap 32 assumes the closed position.

Note that various known actuators such as electromagnetic solenoids can be used as the actuator 50, and the actuator 50 is not limited to the electric cylinder 50A.

According to the fourth embodiment, the waste flap 32 is held in the open position by the electric cylinder 50A, that is, the waste flap 32 is held in the open position by the holding/moving portion 40. Thus, a user can feed trash from the trash feed port 2204 and the trash feed opening 3006 without touching the waste flap 32.

In addition, in a state in which the trash feed opening 3006 is open, when a set temperature of the inside of a trash can device body 24 is reached or exceeded, the waste flap 32 assumes the closed position by the electric cylinder 50A. This closed position is held by the electric cylinder 50A.

In this way, the fire spreading prevention space 38 is formed below the chute 30A, satisfying the Fire Containment requirements specified in United States Federal Aviation Regulations (FAR) 25.853.

Thus, according to the fourth embodiment, as in the first embodiment, the trash can device for the aircraft lavatory unit 10 that allows a user to feed trash from the trash feed opening 3006 to the trash storage space without touching the waste flap 32 while satisfying the Fire Containment requirements specified in United States Federal Aviation Regulations (FAR) 25.853 is obtained.

In addition, according to the fourth embodiment, since the waste flap 32 is moved between the open position and the closed position by the actuator 50, it is advantageous to reliably hold the closed position of the waste flap 32.

Figure 25:
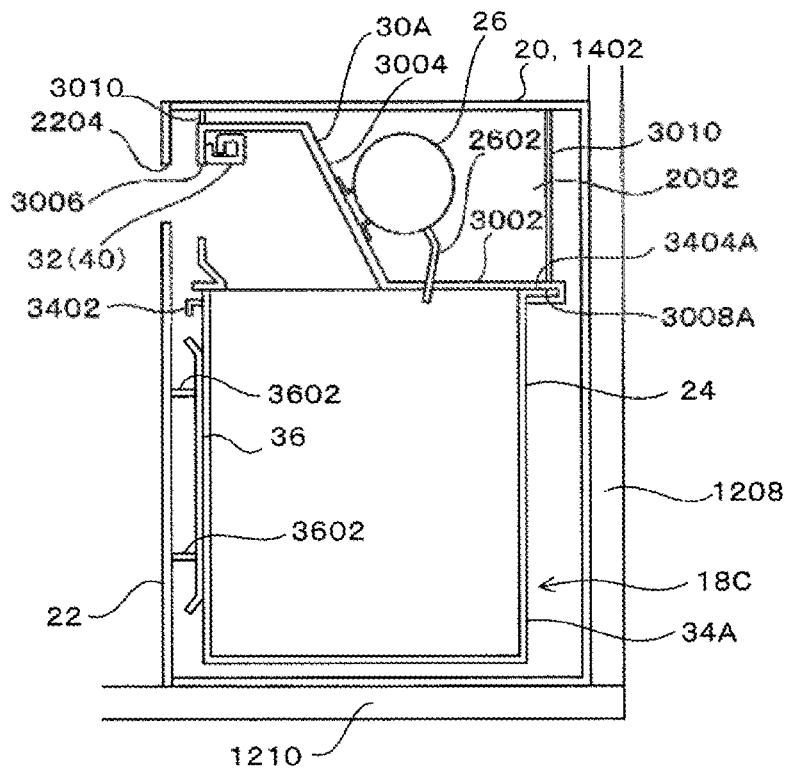
FIG. 25 is a cross-sectional side view of a trash can device according to a fifth embodiment, illustrating a state in which a waste flap is in an open position.
Figure 26:
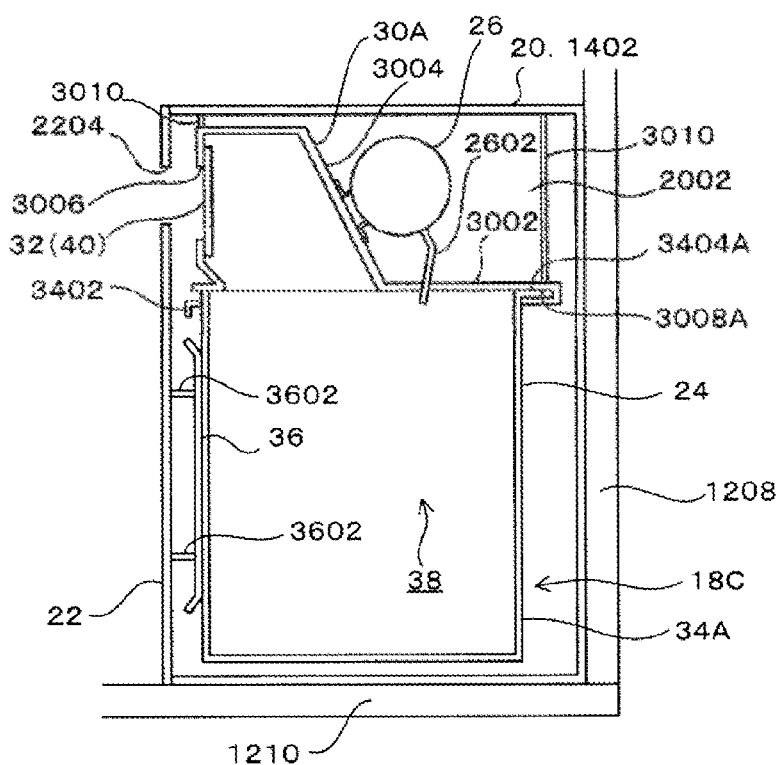
FIG. 26 is a cross-sectional side view of the trash can device according to the fifth embodiment, illustrating a state in which the waste flap is in a closed position.

Next, a lavatory unit 10 according to a fifth embodiment will be explained with reference to FIGS. 25 and 26.

The fifth embodiment is a modified example of from the first to fourth embodiments. In the fifth embodiment, the waste flap 32 includes the holding/moving portion 40.

In the fifth embodiment, the waste flap 32 is formed of a shape memory alloy.

The end portion of the waste flap 32 is attached to a section in the periphery of the trash feed opening 3006. In the present embodiment, the waste flap 32 is attached to the edge portion of the trash feed opening 3006.

The section in the periphery of the trash feed opening 3006 to which the end portion of the waste flap 32 is attached may be above, below, on the left, or on the right of the trash feed opening 3006. In the present embodiment, the waste flap 32 is attached to the section above the trash feed opening 3006.

The waste flap 32 is formed of a shape memory alloy that coils at a section above the trash feed opening 3006, opening the trash feed opening 3006. When exposed to heat, the waste flap 32 formed of a shape memory alloy extends along a flat surface, closing the trash feed opening 3006.

Specifically, in a state in which the trash feed opening 3006 is open, the waste flap 32 coils at the edge portion of the trash feed opening 3006 when the temperature inside the trash can device body 24 is lower than a set temperature, opening the trash feed opening 3006. When the temperature inside the trash can device body 24 reaches or exceeds the set temperature, the waste flap 32 is exposed to the heat of the inside the trash can device body 24 and extends on a flat surface, closing the trash feed opening 3006.

Thus, in the fifth embodiment, the holding/moving portion 40 of the waste flap 32, which holds the waste flap 32 in the open position in which the trash feed opening 3006 is opened and moves the waste flap 32 into the closed position when exposed to heat, includes the waste flap 32 formed of a shape memory alloy.

According to the fifth embodiment, the waste flap 32 is held in the open position by the holding/moving portion 40. Thus, a user can feed trash from the trash feed port 2204 and the trash feed opening 3006 without touching the waste flap 32.

In addition, when a set temperature of the inside of the trash can device body 24 is reached or exceeded, the waste flap 32 assumes the closed position by the holding/moving portion 40. This closed position is held by the holding/moving portion 40, or in other words, by the waste flap 32 itself.

In this way, the fire spreading prevention space 38 is formed below the chute 30A, satisfying the Fire Containment requirements specified in United States Federal Aviation Regulations (FAR) 25.853.

Thus, according to the fifth embodiment, as in the first embodiment, the trash can device 18C for the aircraft lavatory unit 10 that allows a user to feed trash from the trash feed opening 3006 to the trash storage space without touching the waste flap 32 while satisfying the Fire Containment requirements specified in United States Federal Aviation Regulations (FAR) 25.853 is obtained.

Note that, as in the third embodiment, the fifth embodiment can of course be applied to the trash can device 18B in which the trash feed opening 3006 faces upward.

Note that while in the first to fifth embodiments, the case in which the fire spreading prevention space 38 is formed inside the trash can device body 24 provided with the chute 30A and 30B, the waste flap 32, and the waste container 34 has been described, various structures are used in the trash can device for the aircraft lavatory unit 10.

For example, inside the storage chamber 2002, three rectangular side plates having fire resistance performance are provided vertically at three sides of the rectangular bottom plate portion 3002 of the chute 30A, meanwhile, the lower edges of the three side plates are connected to one bottom plate having fire resistance performance, and a space for disposing the waste container with an opening facing the side of the opening/closing plate 22 is formed by the three side plates and one bottom plate.

Then, one back plate having fire resistance performance is provided on the back surface of the opening/closing plate 22, and the opening/closing plate 22 closes the storage chamber 2002. As such, a fire spreading prevention space 38, which prevents fire from spreading when trash fed into the waste container 34 burns, is formed by the three side plates provided vertically at three sides of the bottom plate portion 3002 of the chute 30A, the one bottom plate connected to the lower edges of the three side plates, the one back plate provided on the back surface of the opening/closing plate 22, the chute 30A, and the waste flap 32. The waste container 34 is disposed in the fire spreading prevention space 38 formed as described above.

An embodiment according to the present technology includes the movement of the waste flap 32 that opens and closes the trash feed opening 3006, and an embodiment according to the present technology can be applied to a trash can device having various structures other than the embodiments described above.

The invention claimed is:

1. A trash can device for an aircraft lavatory unit, the aircraft lavatory unit comprising the trash can device including,
   a waste container, housed in a storage chamber of the aircraft lavatory unit, including a trash storage space;
   a chute, disposed above the waste container, including a trash feed opening formed at a section of the chute corresponding to a trash feed port of a panel sectioning off the storage chamber; and
   a waste flap that opens and closes the trash feed opening; wherein
   a fire spreading prevention space is formed below the chute in a state when the waste flap is positioned in a closed position in which the trash feed opening is closed by the waste flap, and
   the trash can device is provided with a holding/moving portion of the waste flap, the holding/moving portion holds the waste flap in an open position in which the trash feed opening is opened and moves the waste flap to the closed position when exposed to heat.

2. The trash can device for an aircraft lavatory unit according to claim 1, wherein
   the trash feed opening is provided on a surface extending in a vertical direction of the chute,
   a base end of the waste flap is swingably supported on an upper portion of the trash feed opening,
   the waste flap closes the trash feed opening in the closed position, due to an empty weight of the waste flap, by assuming a position in which a free end of the waste flap that is opposite the base end is below the base end,
   the waste flap opens the trash feed opening in the open position where the free end of the waste flap that is opposite the base end is raised from the closed position and is away from the trash feed opening,
   a locking member is provided such that, the locking member is formed of a material whose shape changes by heat, the locking member is locked to the waste flap in the open position and holds the waste flap in the open position, and the locking member releases the locking when exposed to heat, and
   the holding/moving portion includes the waste flap and the locking member.

3. The trash can device for an aircraft lavatory unit according to claim 2, wherein
   an elastic member that biases the waste flap into the closed position is provided, and
   the holding/moving portion includes the waste flap, the locking member, and the elastic member.

4. The trash can device for an aircraft lavatory unit according to claim 1, wherein
   the trash feed opening is provided on a surface of the chute parallel to a floor of the aircraft lavatory unit,
   the waste flap is supported on an edge portion of the trash feed opening in a manner that a base end of the waste flap is swingable,
   an elastic member that biases the waste flap into the closed position is provided,
   the waste flap opens the trash feed opening in the open position, by a free end of the waste flap which is opposite the base end being away from the trash feed opening in a downward direction,
   a locking member is provided such that, the locking member is formed of a material whose shape changes by heat, the locking member is locked to the waste flap in the open position and holds the waste flap in the open position, and the locking member releases the locking when exposed to heat, and
   the holding/moving portion includes the elastic member and the locking member.

5. The trash can device for an aircraft lavatory unit according to claim 1 further comprising:
   an actuator that moves the waste flap between the open position and the closed position;
   a sensor that senses heat; and
   a control unit that actuates the actuator in sensing heat by the sensor; wherein
   the holding/moving portion includes the actuator, the sensor, and the control unit.

6. The trash can device for an aircraft lavatory unit according to claim 1, wherein
   the waste flap is formed of a shape memory alloy that coils at a section in a periphery of the trash feed opening and opens the trash feed opening, and that extends on a flat surface and closes the trash feed opening when exposed to heat, and
   the holding/moving portion includes the waste flap.

* * * * *